June 24, 1924.

R. A. HICKOK

RULING MACHINE

Filed July 7, 1921

1,498,841

7 Sheets-Sheet 1

Inventor:
Ross O. Hickok

June 24, 1924. 1,498,841
R. A. HICKOK
RULING MACHINE
Filed July 7, 1921   7 Sheets-Sheet 2
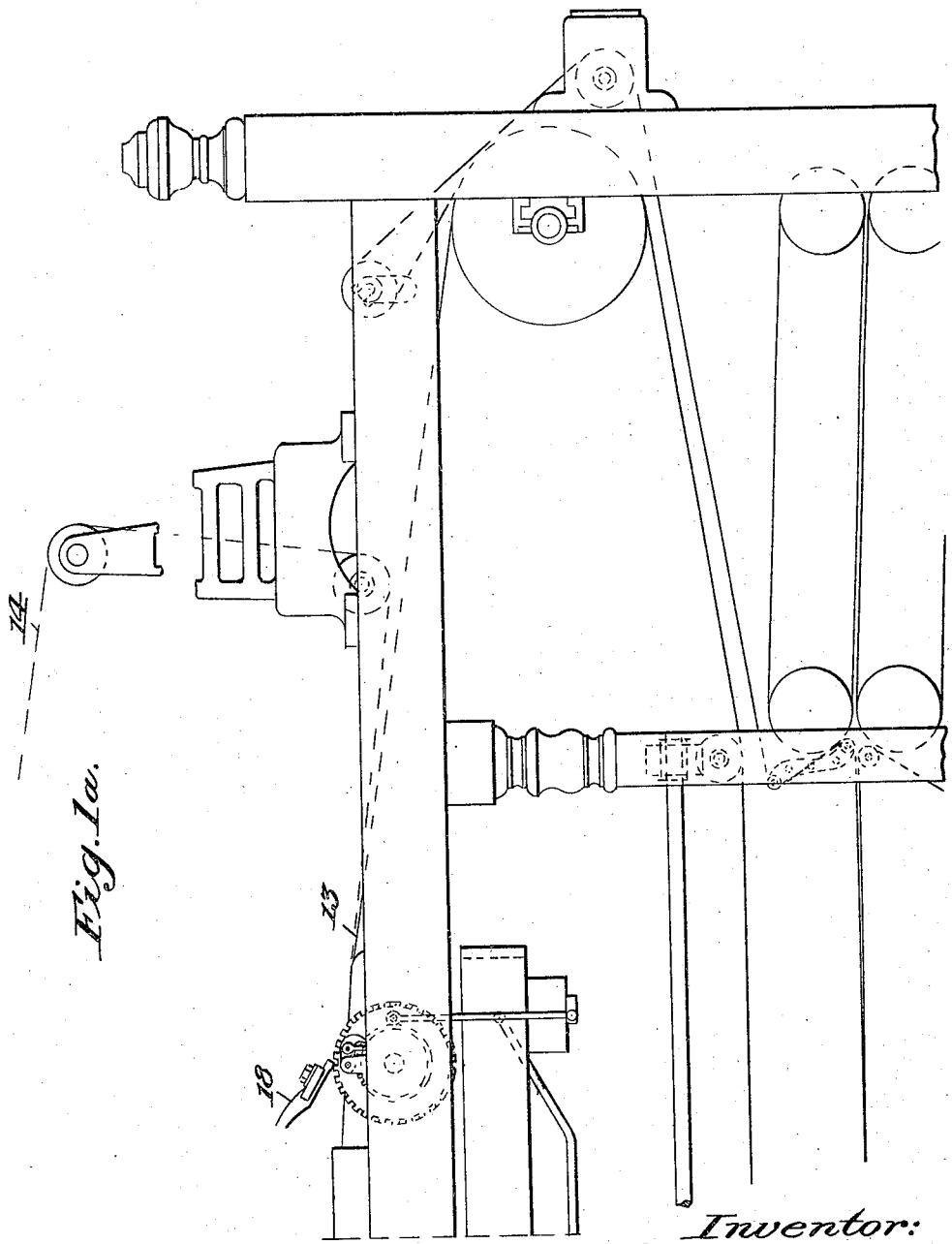

June 24, 1924.

R. A. HICKOK

RULING MACHINE

Filed July 7, 1921

1,498,841

7 Sheets-Sheet 3

Inventor:
Ross O. Hickok
Att'y.

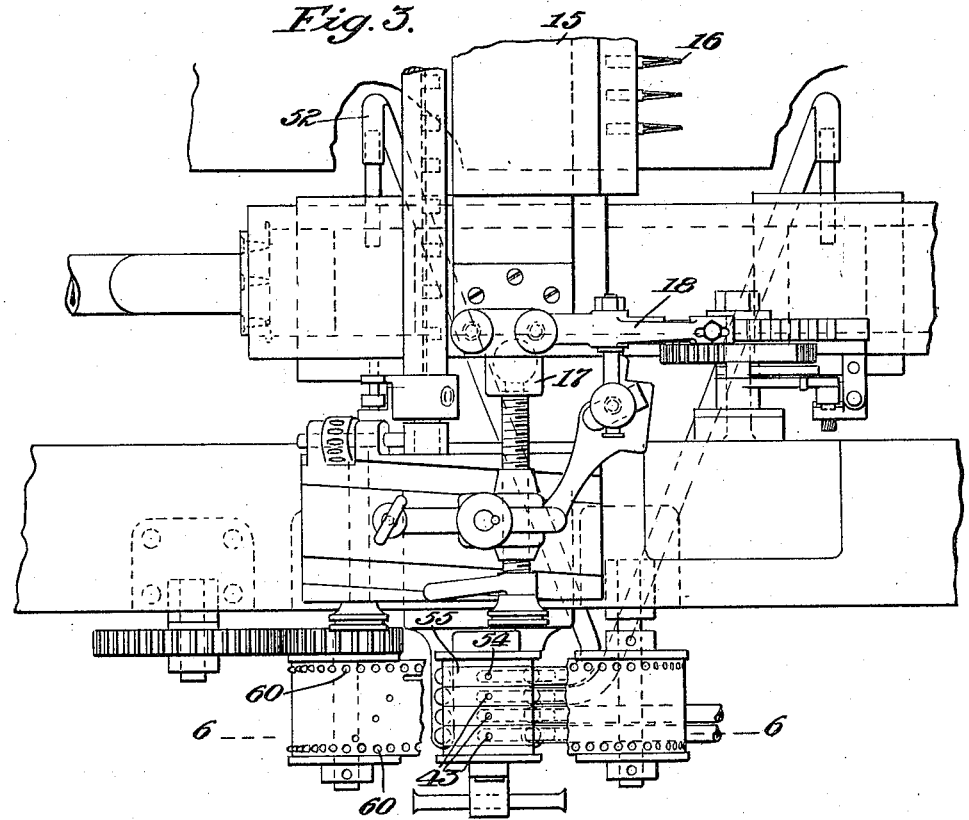
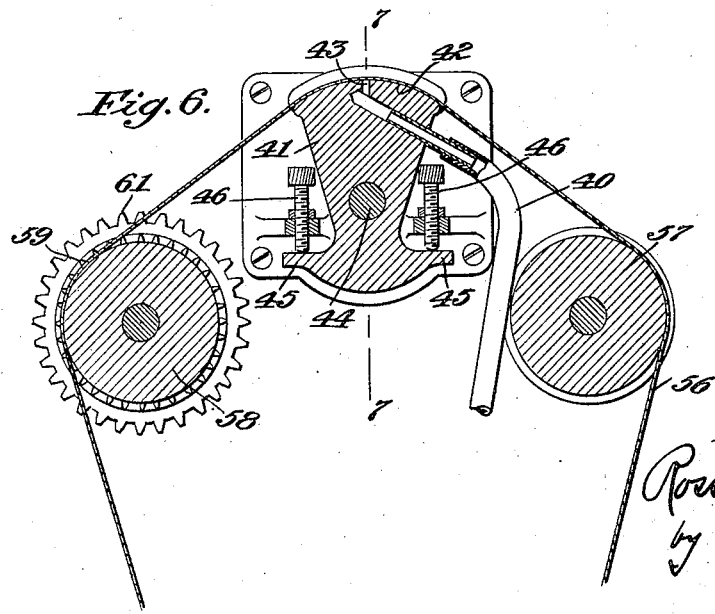

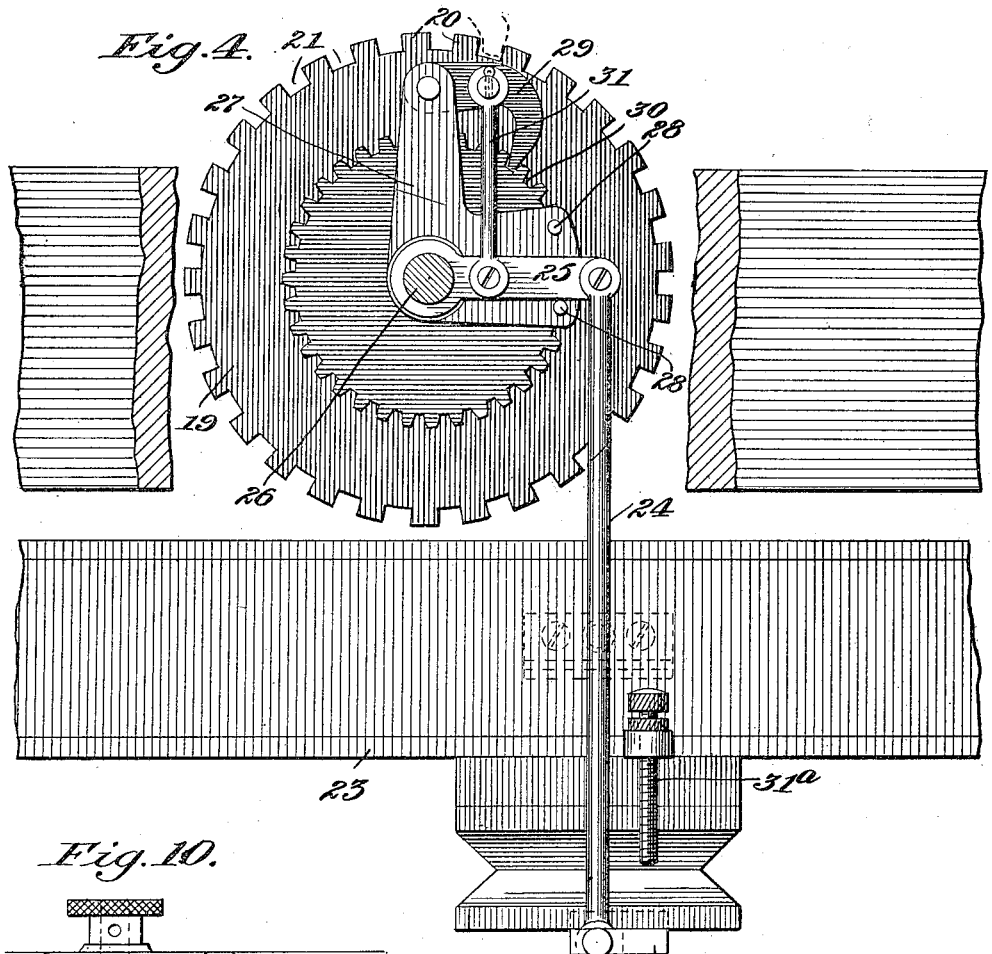
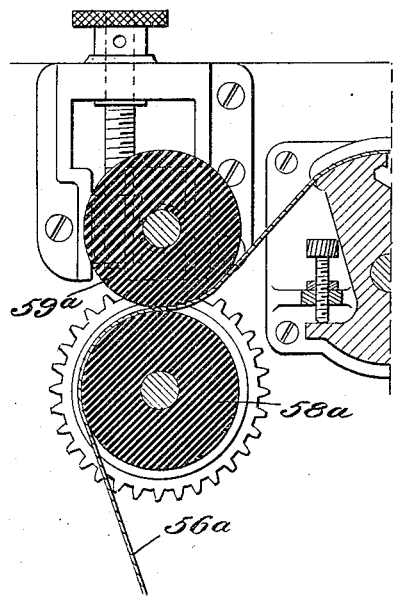

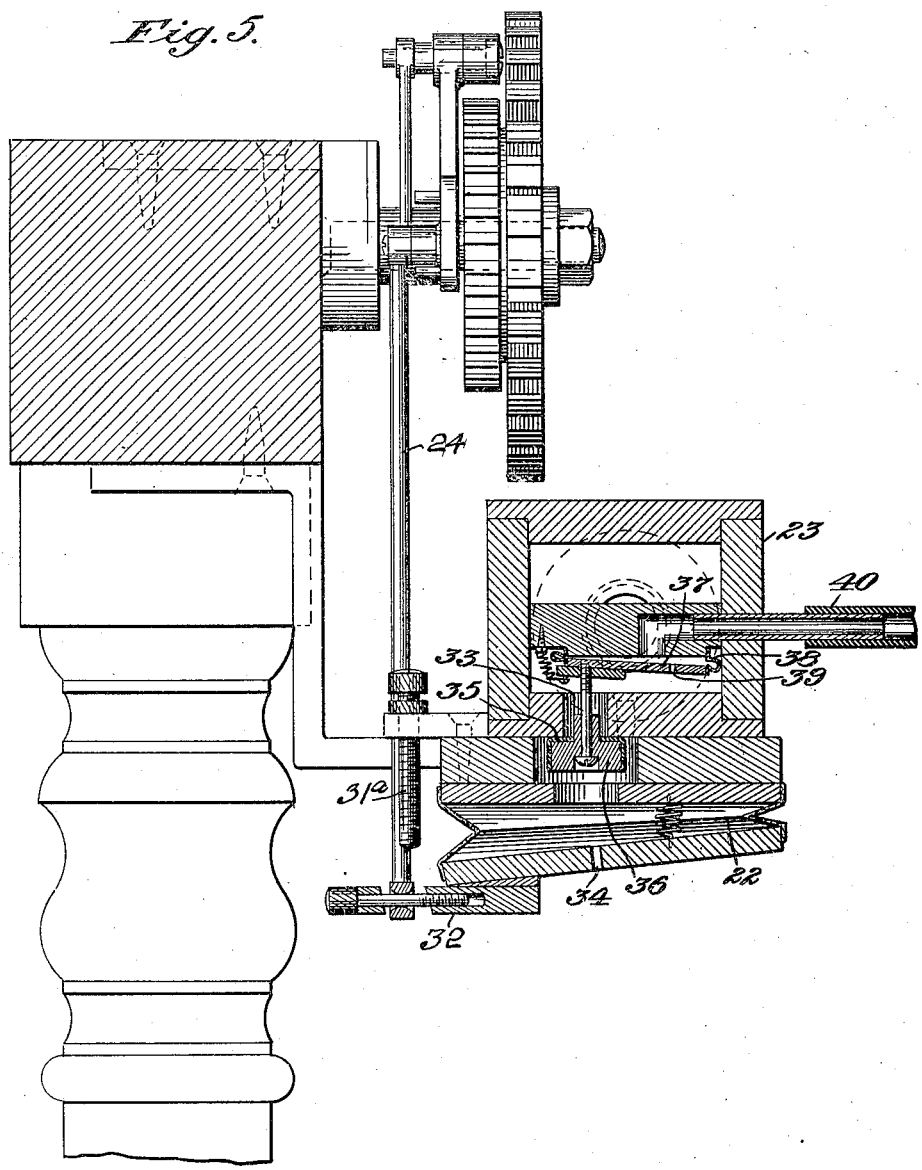

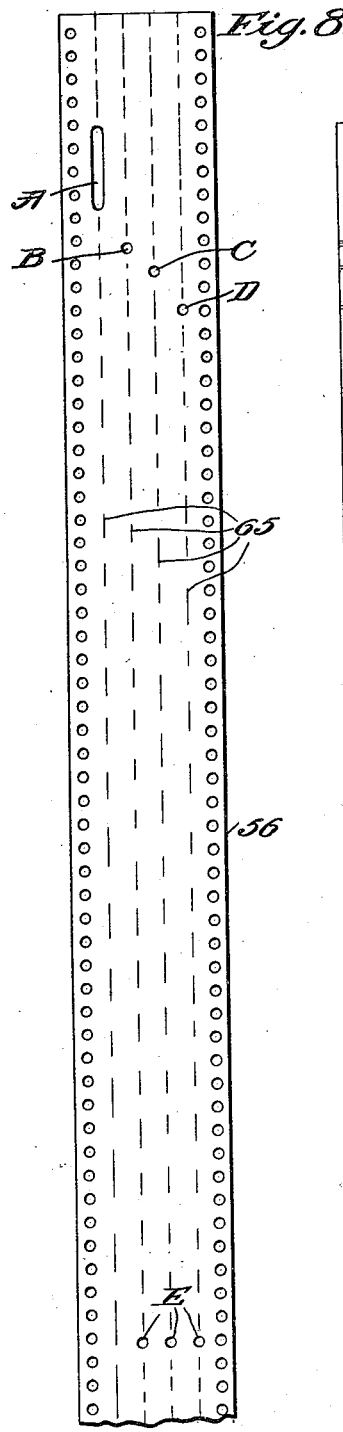
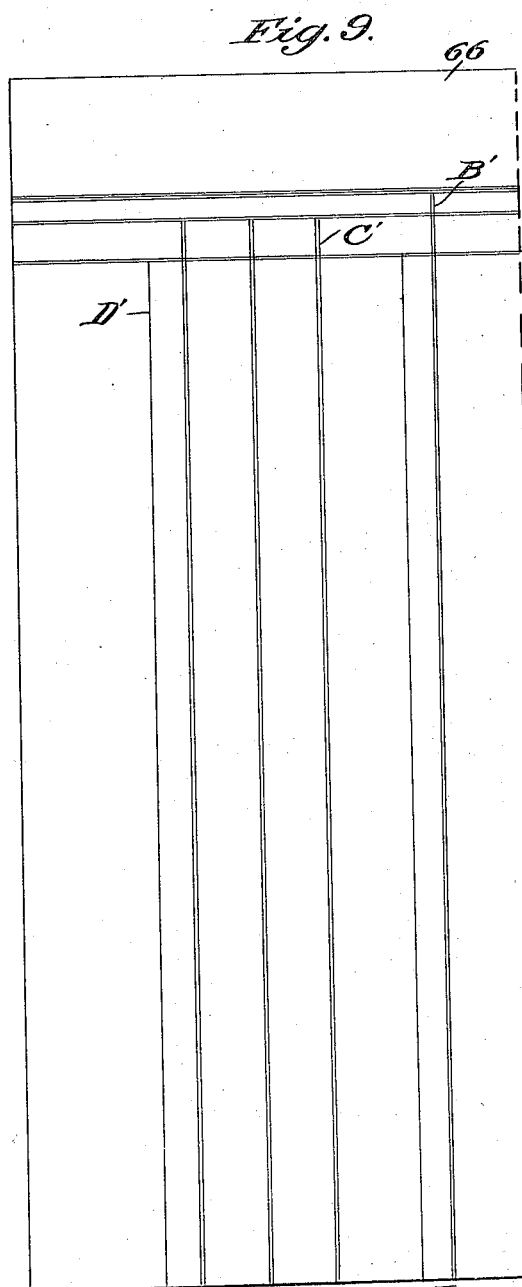

Patented June 24, 1924.

1,498,841

UNITED STATES PATENT OFFICE.

ROSS A. HICKOK, OF HARRISBURG, PENNSYLVANIA, ASSIGNOR TO THE W. O. HICKOK MANUFACTURING COMPANY, OF HARRISBURG, PENNSYLVANIA, A CORPORATION OF PENNSYLVANIA.

RULING MACHINE.

Application filed July 7, 1921. Serial No. 483,108.

*To all whom it may concern:*

Be it known that I, Ross A. HICKOK, a citizen of the United States, residing at Harrisburg, in the county of Dauphin and State of Pennsylvania, have invented certain new and useful Improvements in Ruling Machines, of which the following is a specification.

The present invention relates more particularly to ruling machines, though features thereof may possibly be utilized in connection with apparatus of other analogous types.

One of the primary objects is to provide novel mechanism of a simple and effective character for controlling the action of the gate and the ruling pens or marking devices, provision being made whereby each instrumentality is operated by an individual motor that is thrown into and out of action by suitable controlling means. An incidental advantage results in the fact that but a small amount of movement is essential on the part of the operating means to effect the desired movement of the part acted upon.

A further and important object is the provision of means whereby the operation of the apparatus to produce any desired pattern can be easily, quickly and accurately determined, or in other words the sequence of operations of the various devices may be effected without the necessity of altering and changing the various operating parts, and the governing means is such that it may be removed and replaced upon the machine so that the reproduction of any desired pattern can be made at any time.

One embodiment of the invention is illustrated in the accompanying drawings, wherein:—

Figure 1:
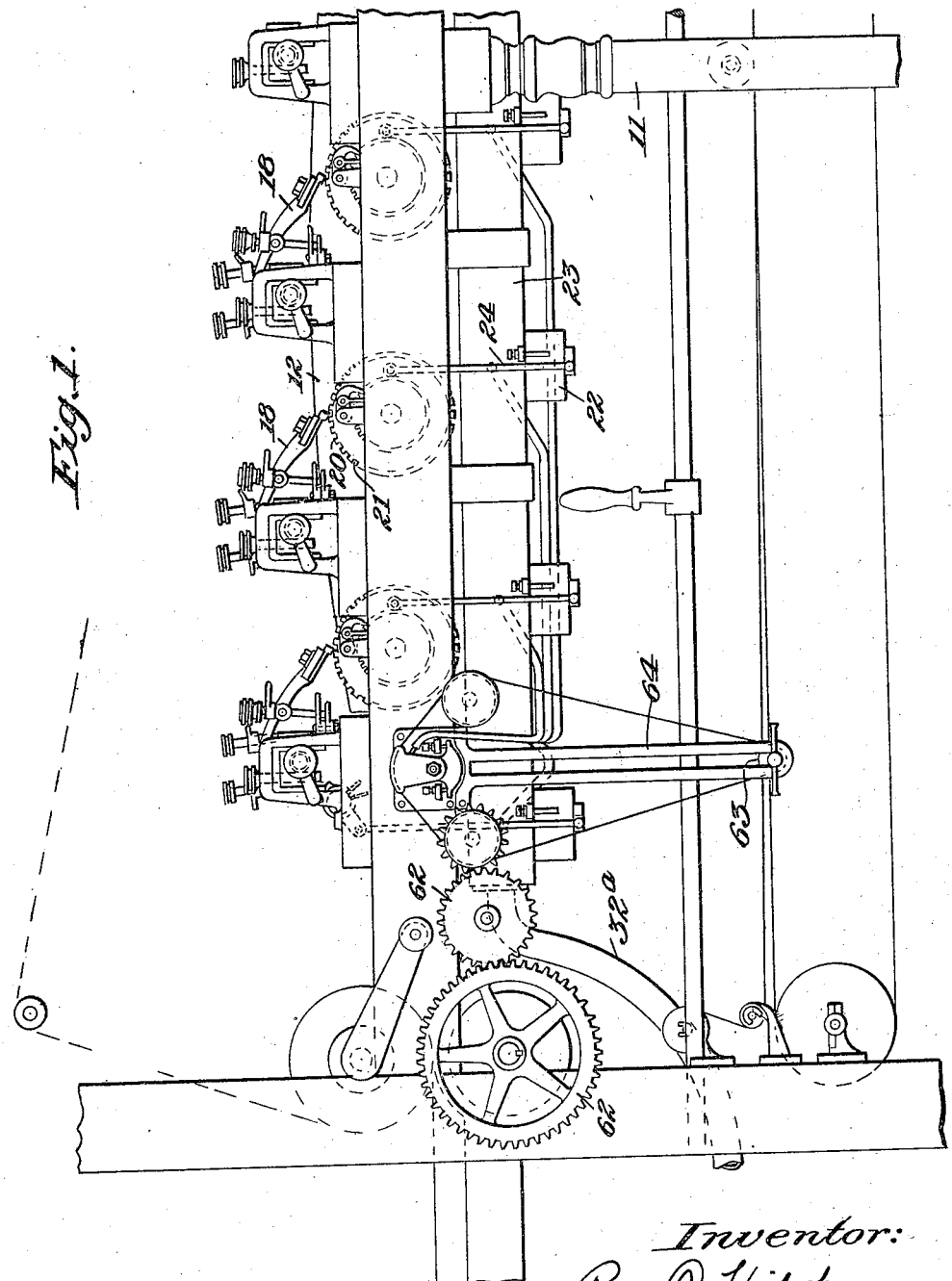

Figure 1 is a view in elevation of a portion of a structure that is at present considered preferable.

Figure 2:
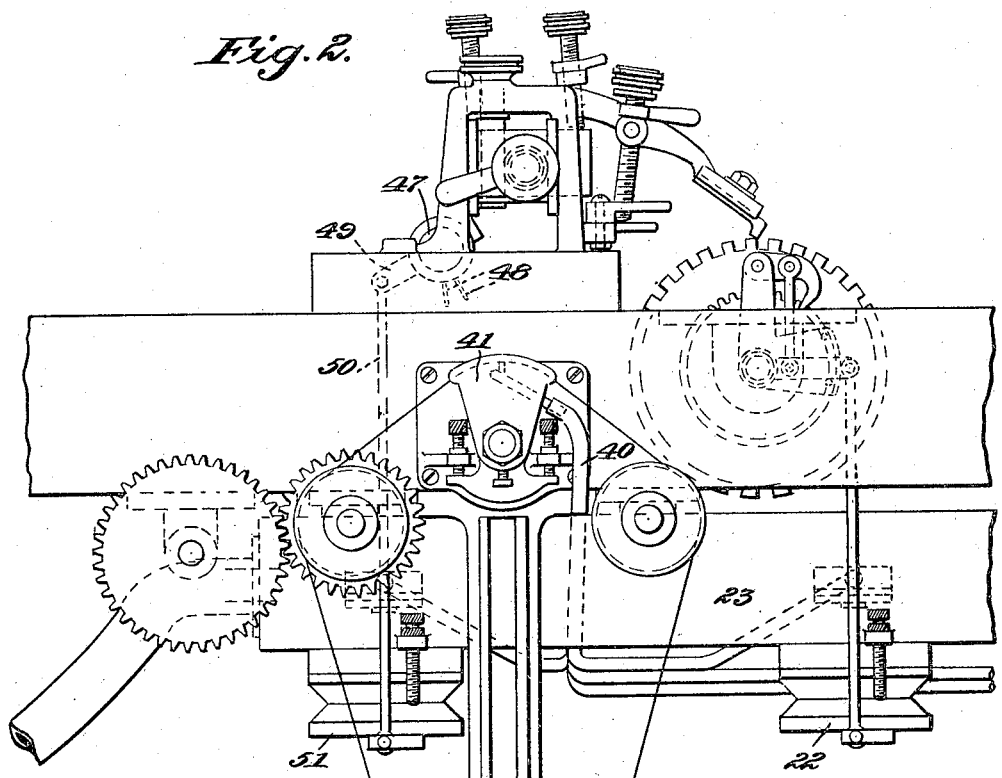

Figure 1ª is a continuation thereof, the two figures constituting in effect an elevation of a ruling machine, Figure 2 is an elevation on an enlarged scale of the gate and one of the marking instrumentalities with the governing or controlling mechanism.

Figure 7:
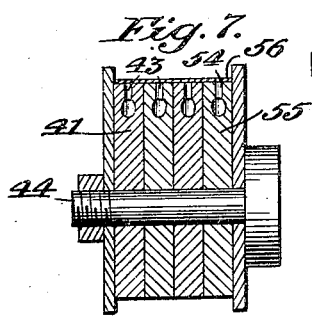

Figure 3 is a plan view of the same,

Figure 4 is a view in elevation on an enlarged scale of one of the controlling cams and its operating mechanism, Figure 5 is a sectional view at right angles to Figure 4, Figure 6 is a detail sectional view taken on the line 6—6 of Figure 3, Figure 7 is a detail sectional view on the line 7—7 of Figure 6, Figure 8 is a plan view of a controlling strip, Figure 9 is a view of the pattern or work that may be produced on the machine when controlled by the strip illustrated in Figure 8, Figure 10 is a detail sectional view of a modification of the driving means for the governing strip.

In the embodiment disclosed, a suitable frame 11 is employed, having the usual longitudinal table 12 therein, over which a work carrying belt 13 operates in a manner well understood by those skilled in the art. The endless cords or threads cooperating with the belt to hold the work thereon are indicated at 14. The marking devices or instrumentalities may be of any well known or desired character, and the present structure consists of beams 15 carrying the usual pens 16, said beams being pivotally supported, as shown at 17, and having actuating arms 18 adjustably connected thereto in the usual manner. The swinging of these arms, as is well known, causes the pens to be lifted out of coaction with the work carrying belt or permit them to be dropped into coaction therewith on the paper carried by said belt. So far as thus disclosed the structure is well known.

In the present embodiment, each arm 18 is swung by an individual mechanism, and as these mechanisms are the same, but one need be described.

A periodically actuated cam element 19 is employed that is in the form of a toothed wheel, the teeth being designated 20 and the interdental spaces 21. The arm 18 rests upon the periphery of the cam element or disk, and is adapted to alternately drop into the depressed or interdental spaces and be elevated by the teeth. The disk or cam element is arranged to be moved each time a distance sufficient to place a raised portion or tooth beneath the arm 18 and then a depressed portion so that the pen beam is thus alternately raised and lowered to correspondingly move the pens out of and into engagement with the work.

An individual motor is employed for actuating each cam element, the motor comprising a bellows designated 22 that is supported on the lower side of an elongated vacuum box 23 mounted longitudinally on the supporting frame 11. This bellows is connected by a link 24 with a swinging arm 25 journaled on the axle 26 of the toothed wheel 19. A bell crank 27 is also journaled on the axle 26, one arm of the bell crank having spaced stop lugs 28 on opposite sides of the arm 25 and adapted to be engaged thereby accordingly as said arm is raised or lowered. The other arm of the bell crank has pivoted thereto a pawl 29 that is movable into and out of engagement with the teeth of a ratchet wheel 30 fixed to the cam disk 19. A link 31 connects the arm 25 and the pawl 29. By referring to Figure 4 it will be clear that with this structure when the bellows is collapsed the link 24 and arm 25, being elevated, will raise the link 31, and thereby elevate the pawl 29 from engagement with the teeth 30, whereupon the arm 25 will strike the upper lug 28 and swing the bell crank lever rearwardly. When the bellows is again extended the first action results in the re-engagement of pawl 29 with the teeth 30, and a continued movement will cause the turning of the cam disk 19. The movement is sufficient to carry either a tooth 20 or a space 21 beneath the free end of the arm 18. The amount of movement of the bellows is determined by an adjustable stop screw 31ª located in the path of a lug 32 on the movable member of the bellows.

The mechanism for effecting the operation of the bellows is substantially as follows. The vacuum box 23 is connected at one end to a hose 32ª leading to the intake side of an exhaust fan (not shown), or other means for creating a vacuum in said box. As shown more particularly in Figure 5, this box 23 has an air port 33 in communication with the interior of the bellows, and said bellows also has a relatively small vent 34 open to the atmosphere. The port 33 is so constructed as to form a valve seat 35 with which a controlling valve 36 cooperates. This controlling valve is carried by the movable member 37 of a bellows 38 located within the vacuum box 23, and said movable member also has a small vent 39 opening into the box 23. A relief conduit 40 has communication with the interior of the bellows 38 and extends to a head 41 mounted on the side of the supporting frame. This head 41 has a rounded upper face 42 (Fig. 6) provided with an admission port 43 that is in communication with the conduit 40.

One of these heads is provided for each marking instrumentality or mechanism, and all are pivotally supported side by side on a pin 44. Moreover each head is adapted to be independently adjustable on the pivot pin 44, and to this end each of said heads is provided with oppositely outstanding abutments 45 against which bear adjusting screws 46.

As is usual in ruling machines, the present structure is provided with a gate for controlling the introduction of the sheets of work to the mechanisms. In the present instance the gate is in the form of a rock shaft 47 provided with teeth 48 that are movable into and out of coaction with the work carrier belt accordingly as said shaft is turned in one direction or the other. This shaft has a crank arm 49 connected by a link 50 with a bellows 51 supported on the under side of the vacuum box 23 and controlled by the same valve mechanism as that already described. The conduit from said valve mechanism is shown at 52 in Figure 3, and is in communication with a port 54 on a head 55 carried by the pin 44 and adjustable as are the heads 41.

The operation of the different instrumentalities comprising the gate and the pen beams is governed by the control of the ports 43 and the port 54. This is accomplished in the present structure by means of an endless band or tape 56 that may be of any suitable material substantially impervious to air, such as paper, celluloid or the like. This band, as clearly shown in Figures 1, 2 and 6, is adapted to move over the curved faces 42 and across the ports 43 and 54. It is mounted and driven by any suitable means. Thus, for example, in Figures 1, 3 and 6, flanged rollers 57 and 58 are located on opposite sides of the heads, one of these rollers, as 58, being provided with annular series of spurs 59 that engage in marginal perforations 60 in the band. The roller 58 is also provided with a gear 61 driven through a train of gearing 62 from a movable shaft on the machine. The lower portion of the strip is guided around a roller 63 adjustably mounted in a depending bracket 64, the roller 63 being adjustably mounted to accommodate bands of different lengths. This strip may be provided at any desired place or places with perforations, for example, as illustrated at A, B, C, D and E in Figure 8. These perforations are adapted to register with the different ports 43 or 54, as they pass over the respective heads. In order to properly locate the perforations the strip may be longitudinally ruled, as shown at 65, Instead of utilizing a driving engagement between the rollers 58 and the strip comprising teeth and perforations, a frictional drive may be utilized as illustrated in Figure 10. In this form the strip is shown at 56ª and the drive roller is designated 58ª, being preferably of rubber or other yielding material. A friction roller, also of compressible material, is shown at 59ª and is adapted to hold the strip in frictional contact with the roller 58ª in order to secure the proper engagement of the strip thereby.

Assuming that there has been a partial vacuum created in the box 23 and that the ports 43 and the port 54 in the heads are closed by the imperforate portions of the endless controller strip, it will be evident that the air in the internal bellows 38 is also exhausted from said bellows through the ports 39, so that the bellows will be collapsed and consequently the valves 36 closed. The motor bellows 22 and 51 will be expanded since the ports 34 therein will admit air under atmospheric pressure thereinto, but said bellows will be inactive or stationary. If now one of the perforations in the endless strip 56 moves into register with the port in one of the heads, obviously air will pass through the conduit connected to said port and enter the bellows 38, said bellows will thereby be expanded, opening the valve 36, and thus bringing the interior of the vacuum box into communication with the motor bellows 22. This obviously causes the collapse of said bellows, and the operation of the cam disk, as above described, the movement of said disk being sufficient to either raise the pen beam or depress the same. In the case of the gate the perforation as A in Figure 8 is in the form of an extended slot sufficiently long to maintain the bellows 51 collapsed to hold the gate elevated and permit the passage of a paper sheet.

With this mechanism the pen beam can be operated in any sequence and for any length of time desired, merely by locating the perforations in proper order, and the laying out of a pattern can be accomplished with the greatest ease, expedition and accuracy. Thus comparing Figures 8 and 9, Figure 9 may represent a particular arrangement of ruling, the sheet being designated 66 and the lines of different lengths being respectively designated B′, C′ and D′. These different lines are made by pens on different pen beams. Having determined just where the pens are to strike, the slot A that is to cooperate with the port 54 for effecting the operation of the gate is located, and the ports B, C and D, for respectively controlling the operation of the pens that are to produce the lines B′, C′, D′, are then formed in the strip laid upon the pattern. The places at which these different pens are to be elevated is determined by the perforations E, in this instance, all being stopped at the end of the sheet. The strip having been perforated in the desired manner, is then put in position and is driven in synchronism with the work carrier belt. In other words, the drive gear 62 is placed upon the shaft carrying the roller around which said belt passes. As a consequence, and as above explained when the slot A passes over the port 54 the gate which is normally elevated will be depressed and so held for a sufficient time to position a sheet of paper and when the end of the slot A passes the port, the gate will be again elevated to permit the sheet to enter the machine on the work carrying belt. As soon as the slot A is passed the gate is again depressed. Thereafter the perforation B will pass over the corresponding port 43 and the corresponding cam will be moved an increment to permit one of the pen beams to drop and the pens thereof to come into contact with the sheet that has passed the gate. As the strip 56 travels at the proper speed with respect to the sheet the perforations C will register with the next port 43 and the second beam will drop. In like manner the third beam will be depressed when the perforation D is brought into communication with its port 43. The three sets of pens will continue to mark until the perforations E register with the three ports, when the different cam disks will be given another increment of movement sufficient to bring the teeth beneath the pen-carrying arms, whereupon said arms will be elevated, causing the elevation of the beams and pens. Should it be found in a trial that one or more of the beams is not operating at just the precise instant to drop the pens at the head or cross lines, its time of action with respect to the parts can be easily varied by adjusting the head on its pivot pin through the medium of the screws. This is also true of the gate action.

Obviously when a job of work is completed the controlling belt can be removed and substituted by another, the perforations of which will vary to suit the new ruling to be produced. These strips can be kept and whenever a duplicate order is to be filled it is only necessary to place the original strip in position and operate the machine under the control of the same. While in the present embodiment pneumatic mechanism is employed and the action is controlled through the creating of a vacuum, obviously other forms of motors may be utilized for securing the operation of the different instrumentalities.

From the foregoing, it is thought that the construction, operation and may advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:

1. In apparatus of the character set forth, the combination with work-carrying means, of marking mechanism movable into and out of coaction therewith, fluid operated means for effecting the movement of the marking mechanism, and periodically operated mechanism for controlling the passage of sheets successively in the work carrying means and in synchronism with the movement of the marking mechanism.

2. In apparatus of the character set forth, the combination with work-carrying means, of marking mechanism movable into and out of coaction therewith, a fluid operated motor connected to the marking mechanism for moving it, means for periodically effecting the operation of the motor, and periodically operated means for controlling the passage of successive sheets on the work-carrying means.

3. In apparatus of the character set forth, the combination with work-carrying means, of marking mechanism movable into and out of coaction therewith, fluid operated means for moving the marking mechanism, and controlling mechanism for said fluid operated means including a device having a portion that repeatedly effects the same actuation of the fluid operated means.

4. In apparatus of the character set forth, the combination with work-carrying means, of marking mechanism movable into and out of coaction therewith, a fluid operated motor, means having a portion that repeatedly operates for admitting fluid into and periodically exhausting it from the motor to periodically and repeatedly effect the same operation of the motor, and means for transmitting motion from the motor to the marking mechanism to move it between its coactive and inactive positions.

5. In apparatus of the character set forth, the combination with work carrying means, of marking mechanism movable into and out of coaction therewith, a bellows, means for periodically exhausting the air from the interior of the bellows to collapse it, means for transmitting motion from the bellows to the marking mechanism, and means for periodically admitting work sheets to be carried successively past the marking mechanism and in synchronism with the movements of said marking mechanism.

6. In apparatus of the character set forth, the combination with work-carrying means, of marking mechanism movable into and out of coaction therewith, a normally inactive motor for moving the marking mechanism, automatic means for periodically effecting the operation of the motor, and means for operating synchronously with the motor for successively presenting separate sheets to the marking mechanism for corresponding markings by said marking mechanism.

7. In apparatus of the character set forth, the combination with work-carrying means, of marking mechanism movable into and out of coaction therewith, a normally inactive motor, automatic means for periodically operating the motor, mechanism actuated by each movement of the motor to alternately move the marking mechanism into and then out of coaction with the work carrier, and means for presenting a series of successive sheets on the work-carrying means, to the marking mechanism to cause duplicated marks to be placed on said sheets.

8. In apparatus of the character set forth, the combination with a work carrier, of marking means movable into and out of coaction therewith, normally idle means for controlling the movement of the marking means, mechanism for periodically effecting the movement of the controlling means to thereby effect the movement of the marking means, a gate cooperating with the work-carrier, and means for operating the gate cooperatively with the marking mechanism to cause sheets to be correspondingly positioned for marking by said marking means.

9. In apparatus of the character set forth, the combination with a work carrier, of marking means movable into and out of coaction therewith, a normally stationary cam for controlling the movement of the marking means, and mechanism independent of the work and operating with the work carrier for periodically effecting the movement of the cam.

10. In apparatus of the character set forth, the combination with a work carrier, of marking means movable into and out of coaction therewith, a normally stationary cam having a plurality of elevated and depressed portions, positioning means for the marking means that ride upon the elevated and depressed portions of the cam, and means for effecting a step-by-step rotation of the cam to cause the elevated and depressed portions to successively assume stationary positions beneath the positioning means.

11. In apparatus of the character set forth, the combination with a movable work carrier, of a pivotally mounted pen beam that cooperates therewith, a normally stationary cam capable of rotation, a positioning arm for the pen beam that rests upon the cam, and means independent of the work and driven synchronously with the work carrier for effecting periodic movements of the cam.

12. In apparatus of the character set forth, the combination with a movable work carrier, of a pivotally mounted pen beam that cooperates therewith, a normally stationary cam capable of rotation and having a series of alternate elevations and depressions, a positioning arm for the pen beam that is adapted to rest alternately on said elevations and depressions, and means for effecting periodic movements of the cam to successive stationary positions that alternately place the elevations and depressions beneath said arm.

13. In apparatus of the character set forth, the combination with a work carrier, of marking means movable into and out of coaction therewith, normally idle means for controlling the movement of the marking means, and pneumatic mechanism for periodically effecting the movement of the controlling means to thereby effect the movement of the marking means.

14. In apparatus of the character set forth, the combination with a work carrier, of marking means movable into and out of coaction therewith, a normally stationary cam having a plurality of elevated and depressed portions, positioning means for the marking means that rest upon the cam, and pneumatic means for effecting a step-by-step rotation of the cam.

15. In apparatus of the character set forth, the combination with a movable work carrier, of a pivotally mounted pen beam that cooperates therewith, a normally stationary cam capable of rotation, a positioning arm for the pen beam that rests upon the cam, and a pneumatic motor for effecting periodic movements of the cam.

16. In apparatus of the character set forth, the combination with a movable work carrier, of a pivotally mounted pen beam that cooperates therewith, a normally stationary cam capable of rotation and having a series of alternate elevations and depressions, a positioning arm for the pen beam that is adapted to rest alternately on said elevations and depressions, a bellows, means for operating the cam by the bellows, and means for periodically causing the operation of the bellows.

17. In apparatus of the character set forth, the combination with work-carrying means, of a plurality of marking means movable into and out of coacting relation therewith, a plurality of motor mechanisms for operating the marking means respectively, a gate for controlling the movement of the work by the work carrying means and controlling mechanism for automatically effecting the operation of the gate and any of the motor mechanisms in predetermined relation therewith.

18. In apparatus of the character set forth, the combination with work-carrying means, of a plurality of marking means movable into and out of coacting relation therewith, a plurality of pneumatic motor mechanisms for operating the marking means respectively, a gate for controlling the movement of the work by the work carrying means and automatic mechanism for individually controlling the action of the gate and the different motors to effect their respective operations.

19. In apparatus of the character set forth, the combination with work-carrying means, of a plurality of pen beams movably associated therewith, a motor for each pen beam, and pneumatic means for throwing any of the motors into and out of operation.

20. In apparatus of the character set forth, the combination with work-carrying means, of a plurality of pen beams movably associated therewith, a pneumatic motor for each pen beam, means for supplying a common actuating fluid to the different motors, and means for individually controlling the operation of the various motors.

21. In apparatus of the character set forth, the combination with work-carrying means, of a plurality of pen beams movably associated therewith, a pneumatic bellows motor for each pen beam, an air box having connections with the various bellows, valves controlling the different communications, and means for individually actuating the valves.

22. In apparatus of the character set forth, the combination with work-carrying means, of a plurality of pens beams movably associated therewith, a motor for each pen beam, a plurality of cams, devices that support the respective beams, and rest upon the cams and a mechanism operated by each of the motors for respectively moving one of the cams.

23. In apparatus of the character set forth, the combination with a work carrier belt, of a plurality of pen beams pivoted thereover, a cam for each pen beam having a plurality of elevated and depressed portions, an arm on each pen beam adapted to rest alternately on the elevated and depressed portion of its cam as the cam is rotated step by step, a pneumatic bellows for each cam, means actuated by repeated movements of the bellows for effecting a step-by-step movement of the corresponding cam, and automatic means for effecting the alternate supply of air to and its exhaustion from the bellows.

24. In apparatus of the character set forth, the combination with a movable work carrier, of a movable feed controlling gate cooperating therewith, a fluid operated motor for actuating the gate, and automatic means for periodically actuating the motor to operate the gate.

25. In apparatus of the character set forth, the combination with a movable work carrier, of a movable feed controlling gate cooperating therewith, a pneumatic motor for actuating the gate, and automatic means for controlling the air that actuates the motor for effecting the periodic operation of the motor.

26. In apparatus of the character set forth, the combination with a movable work carrier, of a movable feed controlling gate cooperating therewith, a pneumatic motor, bellows, operating connections between the bellows and gate, and means for controlling the supply of air to and its exhaust from the bellows to control the operation of the gate.

27. In apparatus of the character set forth, the combination with a movable work carrier, of a movable feed controlling gate cooperating therewith, a cam, an actuating arm for the gate that rests against and is operated by the cam, and automatic means for periodically operating the cam.

28. In apparatus of the character set forth, the combination with a movable work carrier, of a movable feed controlling gate cooperating therewith, a cam having a plurality of alternate elevated and depressed portions, an actuating arm for the gate that operates against the elevated and depressed portions of the cam, and automatic means for periodically actuating the cam to successively bring the elevated and depressed portions into association with the arm.

29. In apparatus of the character set forth, the combination with a movable work carrier, of a movable feed controlling gate cooperating therewith, a cam having a plurality of alternate elevated and depressed portions, an actuating arm for the gate that operates against the elevated and depressed portions of the cam, a pneumatic bellows, automatic means for periodically expanding and contracting the same, and a ratchet mechanism for transmitting intermittent motion from the bellows to the cam.

30. In apparatus of the character set forth, the combination with a work carrier, of an instrumentality movable into and out of coaction therewith, a motor for moving said instrumentality, and mechanism for governing the operation of the motor including an endless controller having means for repeatedly operating to permit the intermittent operation of the motor.

31. In apparatus of the character set forth, the combination with a work carrier, of an instrumentality movable into and out of coaction therewith, a motor for moving said instrumentality, and mechanism for governing the operation of the motor including an endless flexible controller having means for repeatedly operating to permit the intermittent operation of the motor, and means for continuously driving the controller.

32. In apparatus of the character set forth, the combination with a work carrier, of an instrumentality movable into and out of coaction therewith, a motor for moving said instrumentality, a conduit connected to the motor, and having a port, a work controlling gate, means for periodically moving the gate, a controller movable over said port and having a port movable into and out of communication with said conduit port, and means for operating the controller to cause the operation of the instrumentality in predetermined relation to the gate.

33. In apparatus of the character set forth, the combination with a work carrier, of an instrumentality movable into and out of coaction therewith, a motor for moving said instrumentality, a conduit connected to the motor and having a port, an endless controlling strip movable over said port and having a port repeatedly movable into and out of communication with said conduit port, and means for continuously operating the strip.

34. In apparatus of the character set forth, the combination with a work carrier, of an instrumentality movable into and out of coaction therewith, a motor for moving said instrumentality, a conduit connected to the motor having a port, means for varying the position of said port, a controller movable over said port and having a port movable into and out of communication with said conduit port, and means for operating the controller.

35. In apparatus of the character set forth, the combination with a work carrier, of an instrumentality movable into and out of coaction therewith, a motor for moving said instrumentality, a conduit connected to the motor, an adjustable head through which the conduit opens, a controller movable over the head and covering and uncovering the conduit, and means for moving the controller in synchronism with the work carrier.

36. In apparatus of the character set forth, the combination with a work carrier, of an instrumentality movable into and out of coaction therewith, a motor for moving said instrumentality, a conduit connected to the motor, a pivotally supported head through which the conduit opens, an endless flexible controller strip that moves over the head and has a port that is adapted to move across the end of the conduit, and means for moving the controller strip in synchronism with the work carrier.

37. In apparatus of the character set forth, the combination with a work carrier, of a plurality of instrumentalities for operating on the work on said carrier and comprising a controlling gate and a marking device, pneumatic motors for respectively operating the different instrumentalities, and a common controller for individually controlling the movement of the different motors.

38. In apparatus of the character set forth, the combination with a work carrier, of a plurality of marking devices located at different points along the path of travel of the work carrier movable into and out of engagement with the work on said carrier, pneumatic motors for respectively operating the different marking devices, and a common controller for individually controlling the movement of the different motors to successively operate on pieces of work carried by the work carrier.

39. In apparatus of the character set forth, the combination with a work carrier, of a marking device movable into and out of engagement with the work on said carrier, a gate movable into and out of coaction with the carrier to govern the feed of the work, a pneumatic motor for moving the marking device, a pneumatic motor for moving the gate, and means for individually controlling the operations of the motors.

40. In apparatus of the character set forth, the combination with a work carrier, of a marking device movable into and out of engagement with the work on said carrier, a gate movable into and out of coaction with the carrier to govern the feed of the work, a pneumatic motor for moving the marking device, a pneumatic motor for moving the gate, and common automatic means for individually controlling the operations of the motors.

41. In apparatus of the character set forth, the combination with a work carrier, of a plurality of instrumentalities for operating successively on a work sheet on said carrier, pneumatic motors for respectively operating the different instrumentalities, a common controller for individually controlling the movement of the different motors, and means for operating the controller in synchronism with the carrier.

42. In apparatus of the character set forth, the combination with a work carrier, of a plurality of marking devices located at different points along the path of travel of the work carrier and movable into and out of engagement with the work on said carrier, motors for respectively operating the different marking devices, a common controller for individually controlling the movement of the different motors, and means for operating the controller in synchronism with the carrier.

43. In apparatus of the character set forth, the combination with a work carrier, of a marking device movable into and out of engagement with the work on said carrier, a gate movable into and out of coaction with the carrier to govern the feed of the work, a pneumatic motor for moving the marking device, a pneumatic motor for moving the gate, means for individually controlling the operations of the motors, and means for operating the controller in synchronism with the carrier.

44. In apparatus of the character set forth, the combination with a movable work carrier, of a plurality of individually movable instrumentalities movable into and out of engagement with work on the carrier, a plurality of pneumatic motors for respectively operating the instrumentalities, conduits connected to the motor and having ports and a controller operating over the ports and having ports that communicate with the conduit ports.

45. In apparatus of the character set forth, the combination with a movable work carrier, of a plurality of individually movable instrumentalities located at different points along the path of travel of the work carrier and movable into and out of engagement with work on the carrier, a plurality of pneumatic motors for respectively operating the instrumentalities, conduits connected to the motor and having heads provided with ports, and controlling means operating over the heads and covering and uncovering the ports.

46. In apparatus of the character set forth, the combination with a movable work carrier, of a plurality of individually movable instrumentalities movable into and out of engagement with work on the carrier, a plurality of pneumatic motors for respectively operating the instrumentalities, conduits connected to the motor and having heads provided with ports, means for adjusting the relative positions of the ports, and controlling means operating over the heads and covering and uncovering the ports.

47. In apparatus of the character set forth, the combination with an endless work-carrying belt, of a work-gate for controlling the feed of the work to the belt, a marking device movable into and out of coaction with the belt, pneumatic motors for respectively operating the gate and marking device, and mechanism operating with the belt for controlling the operation of the pneumatic motors.

48. In a ruling machine, the combination with a movable pen carrying device, of means for carrying sheets successively past the pen carrying device, a movable gate for controlling the relative positions of the sheets on the sheet carrying means, means for periodically moving the gate, and pneumatically operated means for periodically actuating the pen to operate on the successive sheets.

49. In a ruling machine, the combination with a movable pen carrying device, of means for carrying sheets successively past the pen carrying device, a movable gate for controlling the relative positions of the sheets on the sheet carrying means, and pneumatically operated means for periodically actuating the gate and periodically actuating the pen carrying device to correspondingly mark on the successive sheets carried by the carrying means and positioned by the gate.

50. In a ruling machine, the combination with an endless sheet-carrying belt, of a movable pen beam thereon, a movable sheet controlling gate over the belt, pneumatically operated motors for respectively actuating the gate and pen beam, and a controller for said motor operating with the belt to govern the operations of said motors.

In testimony whereof, I affix my signature in the presence of two witnesses.

ROSS A. HICKOK.

Witnesses:
A. H. BALDWIN,
C. M. BUFFINGTON.